United States Patent [19]

Finnila et al.

[11] 4,099,250

[45] Jul. 4, 1978

[54] HADDAMARD ELECTRONIC READOUT MEANS

[75] Inventors: Ronald M. Finnila; Dale G. Maeding, both of Carlsbad, Calif.

[73] Assignee: Hughes Aircraft Company, Culver City, Calif.

[21] Appl. No.: 752,036

[22] Filed: Dec. 20, 1976

[51] Int. Cl.[2] .......................... G06G 7/12; H04N 3/14

[52] U.S. Cl. ................................ 364/826; 250/211 J; 307/221 D; 358/213; 364/862

[58] Field of Search ............... 235/197, 193, 156, 152, 235/164; 179/15 BC; 358/160, 212, 213, 241; 340/173 LS; 307/221 D; 357/24, 30; 250/211 J; 364/826, 862, 725

[56] References Cited

U.S. PATENT DOCUMENTS

| | | | |
|---|---|---|---|
| 3,775,602 | 11/1973 | Alexandridis et al. | 235/156 |
| 3,805,062 | 4/1974 | Michon et al. | 250/211 J |
| 3,859,515 | 1/1975 | Radcliffe, Jr. | 235/164 |
| 3,919,468 | 11/1975 | Weimer | 250/211 J |
| 4,011,441 | 3/1977 | Michon et al. | 235/193 |

*Primary Examiner*—Joseph F. Ruggiero

*Attorney, Agent, or Firm*—Martin E. Gerry; W. H. MacAllister

[57] ABSTRACT

A device for performing Haddamard transform operations including a first matrix of interconnected electronic cells, and a second matrix of interconnected electronic cells connected to the output of the first matrix, the electronic cells being charge coupled devices. A rectangular wave generator is electronically connected to the first and second matrices. The first matrix comprises a plural number of rows of such electronic cells serially connected to each other, the output of each one of the rows being connected to an input of each one of the cells corresponding to one of the rows of the second matrix. As a result a solution of on-focal plane Haddamard transform is obtained by recording the Haddamard sequencies at a common terminal of the second or output matrix.

13 Claims, 4 Drawing Figures

HADDAMARD ELECTRONIC READOUT MEANS

BACKGROUND OF THE INVENTION

This invention is in the field of charge coupled devices, hereinafter referred to as CCD, utilized for implementing a Haddamard transform representative of sequency components of an image directly on the image focal plane.

Haddamard transform methods are frequently used in video signal processing systems.

The prior art, inter alia, requires large CCD multiplexing registers which introduce transfer errors.

Also, in the prior art the imaged data is multiplexed in the off-focal plane in the time domain. Such data is then A/D converted and fed to a digital processor that operated on the data to take the Haddamard transform thereof.

SUMMARY OF THE INVENTION

According to the scope of the invention, the novel features comprise implementation of the Haddamard transform directly on an image focal plane.

The signal sensed from the focal plane will thus, without more, be in the transformed or sequency domain inapposite to either the space or time domains.

The order in which a transform is taken is governed by the mechanization and matrix interconnection of the CCD's with respect to the sequencies, and thus by virtue of such mechanization the CCD matrices are self programmable from which undesired sequencies may be deleted.

Hence an object of the invention is to improve contemporary methods of taking the Haddamard transform of an image by eliminating all off-focal plane transform processing.

The transformed sequencies can be selected using programmed clocks. This results in a highly flexible system in which undesired sequencies can be eliminated.

Accordingly, unlike the prior art, the scheme presented does not require CCD multiplexing registers and hence eliminates a source of errors introduced by the presence and operation of such registers.

The present system, not taking imaged data in the off-focal plane time domain, does not require A/D converters nor digital processors to effect a Haddamard transform of the data.

The method utilized in mechanization, is equally applicable to a one or two dimensional Haddamard transforms taken directly on the focal plane.

DETAILED DESCRIPTION

Figure 2:
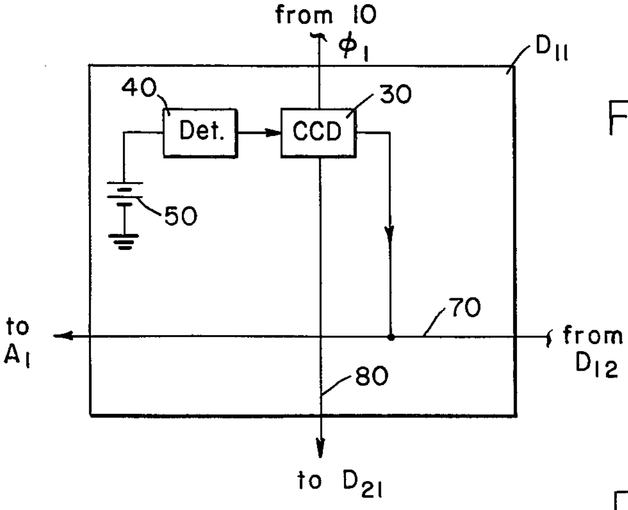
FIG. 2 is a detailed block schematic breakdown of one of the elements of the square matrix as in FIG. 1.
Figure 3:
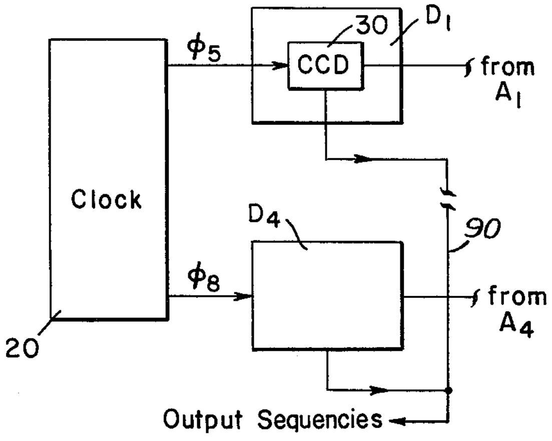
FIG. 3 is a simplified schematic of two unit cells of one of the matrices capable of providing a Haddamard transform.

With reference to the figures, several matrices of CCD's may therefore be utilized wherein the square matrix has an array of CCD's each of which is referred to as the unit cell composing a CCD 30, a detector 40 and a DC bias source 50, illustrated in FIG. 2. The unit cell is typically shown at $D_{11}$.

Figure 1:
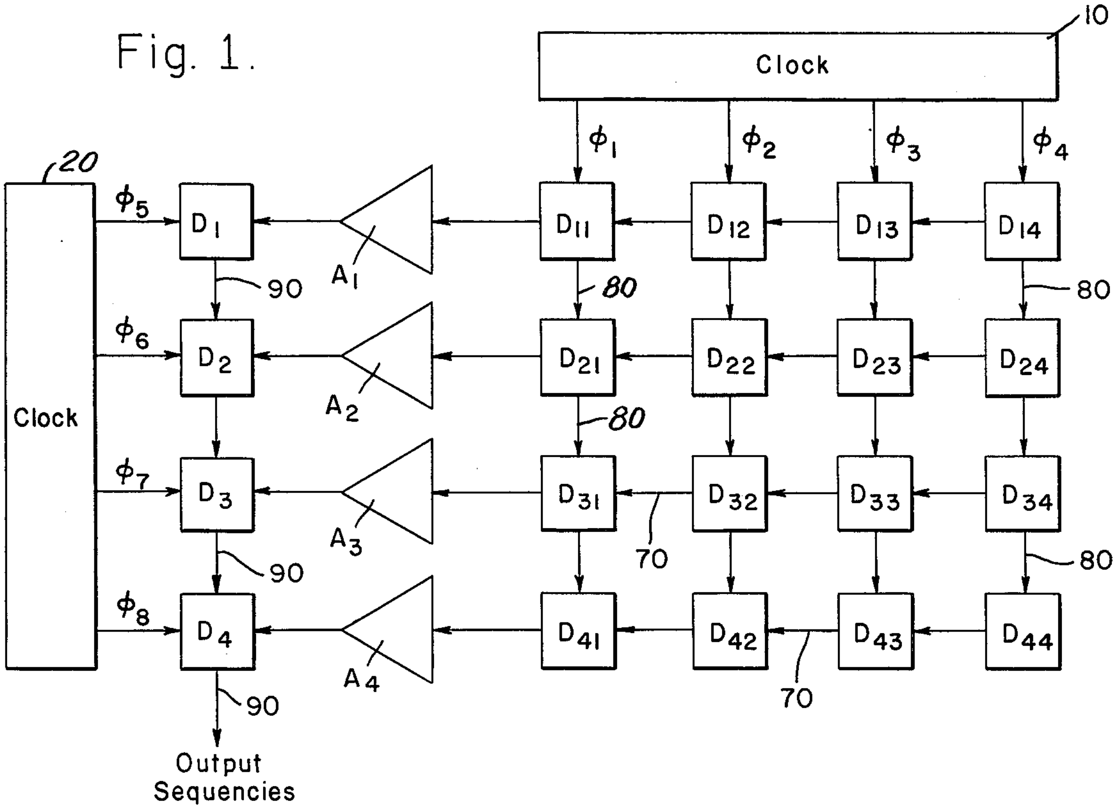
FIG. 1 is a block electrical schematic of a pair of matrices according to the invention.

In the illustration of FIG. 1, two unit cell matrices are shown. One unit cell matrix is of the $4 \times 4$ type, $D_{11} \ldots D_{44}$, and the other is a single column matrix $D_1 \ldots D_4$.

Matrix of unit cells $D_{11} \ldots D_{44}$ is interconnected electrically in the horizontal direction by bus wires 70 and in the vertical direction by bus wires 80.

With reference to clocks 10 and 20, it may be seen that clock 10 feeds signal levels $\phi_1$, $\phi_2$, $\phi_3$ and $\phi_4$ required to provide a four sequency transform set, which signal levels constitute a series of rectangular signals the amplitude of which is unity, in different phase relationships and repetition rates feeding bus bar system 80 and thus feeding all unit cells $D_{11}$ and $D_{44}$. Clock 20 provides like signals of different repetition rates and phase relationships referred to as $\phi_5$, $\phi_6$, $\phi_7$ and $\phi_8$ which feed unit cells $D_1$ through $D_4$, respectively.

Buffer amplifiers $A_1$ through $A_4$ are optionally provided, integral between the outputs of cells $D_{11}$, $D_{21}$, $D_{31}$ and $D_{41}$ and cells $D_1$, $D_2$, $D_3$ and $D_4$, respectively, chiefly for isolation of the two matrices. Cells $D_1$ through $D_4$ are interconnected by means of bus bar 90 which also provides the output sequence components of the on-focal plane Haddamard transform.

As an example, one unit cell $D_{11}$ is illustrated in FIG. 2. It is noted that CCD 30 and optical detector 40 are both well known in the art. In this unit cell example, CCD 30 receives the $\phi_1$ input from clock 10. Bus bar system 70 provides means for connecting the output of CCD 30 so as to feed such bus bar which in this illustration will feed amplifier $A_1$, when used, or otherwise as a direct input to $D_1$. Bus bar 70 acts herein as a means for summing all the CCD type 30 outputs of matrix $D_{11} \ldots D_{44}$. Also a like summing bar 90 provides the sum of the outputs of $D_1 \ldots D_4$, which receive inputs from amplifier $A_1 \ldots A_4$ when used, or otherwise inputs directly from $D_{11} \ldots D_{41}$. CCD 30 is interconnected with photosensitive detector 40, as an input to CCD 30, detector 40 being an element at one rectangular coordinate point on the focal plane. Detector 40 is normally DC biased by battery 50, as shown.

Figure 4:
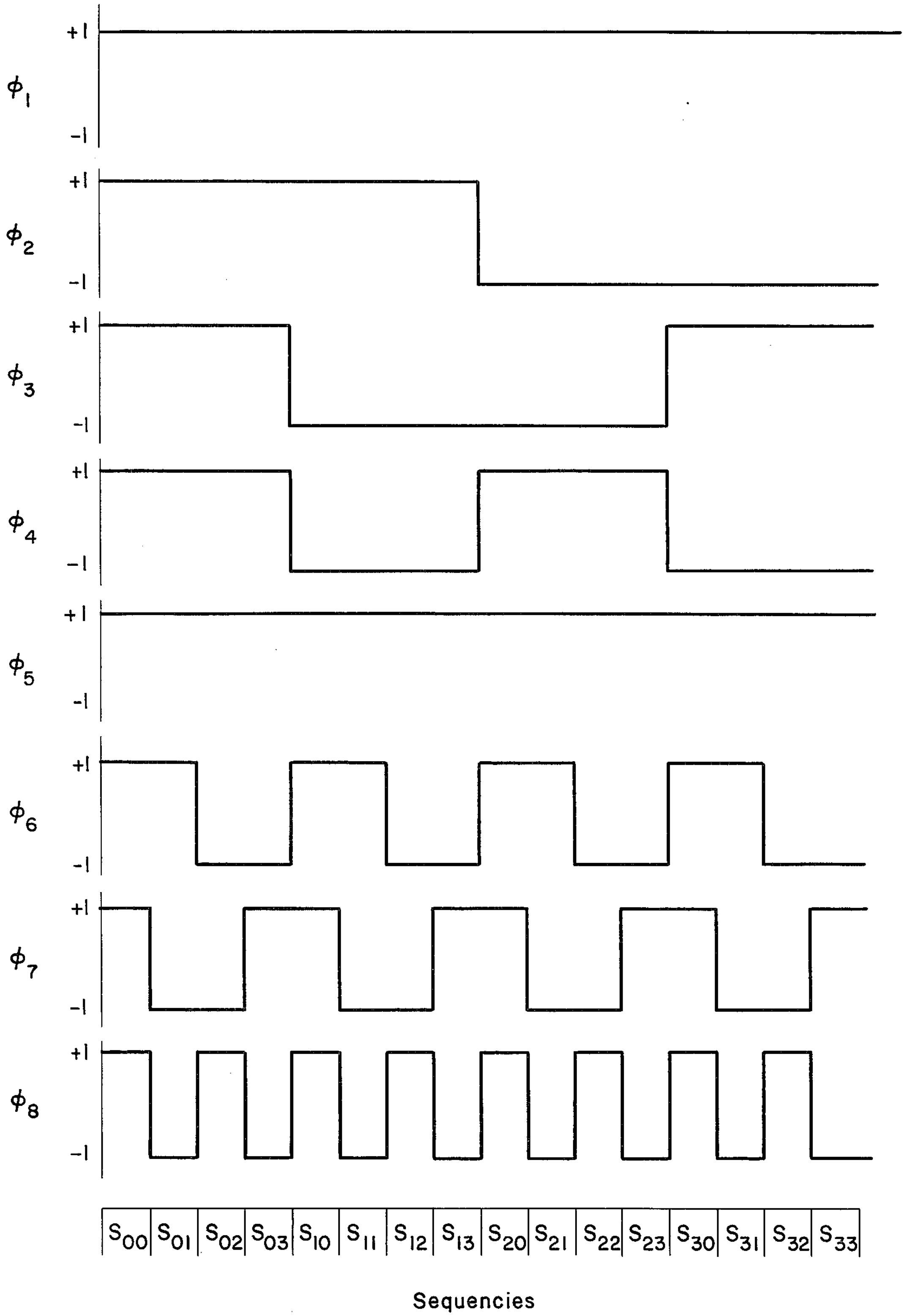
FIG. 4 is a phase related set of waveforms eonstituting logic level inputs from a pair of clocks that give rise to a plurality of Haddamard sequencies when inputted to the system of FIG. 1.

Any one dimensional array can easily be extended to a two dimensional array. FIG. 1 shows the arrays and the required clocks. The first matrix multiplication takes place on the focal plane and the second matrix multiplication take place at the output cell array $D_1$ through $D_4$, with the clocks labeled $\phi_5$ to $\phi_8$. The reset circuitry is not shown in order to enhance simplicity in illustrating the invention. The output cells operate in the same fashion as the unit cells, except the signals are inputs from amplifiers $A_1$ through $A_4$ instead of detectors $D_{11}$ through $D_{44}$. The $\phi_5$ to $\phi_8$ waveforms operate at different clock rates as compared with the $\phi_1$ to $\phi_4$ clock rates, as diagrammatically shown in FIG. 4.

The output cells can also be used as a multiplexer for a one dimensional array output if clocks $\phi_5$ to $\phi_8$ are pulsed-on in-sequence.

The sequencies resulting from an on focal plane of one or two dimensional Haddamard transform structure, may be read directly from such focal plane without CCD read out registers or adjoining CCD transversal filters. In this system, option is available to address only such sequencies as are desired.

The two matrix array of FIG. 1 may be expressed in matrix algebraic form. The Haddamard transform comprises a matrix similar to the algebraic matrix of series of ±1's comprising such algebraic-like matrix, which provide the sequencies $S_{00}$ through $S_{33}$.

The Haddamard transform may be expressed in matrix algebraic symbology as illustrated by expressions (1) through (5).

$$[S] = [h_1]\,[d]\,[h_1]$$

where:
$[S]$ = sequency pattern of the Haddamard matrix (1)
$[h_1]$ = Haddamard matrix
$[d]$ = unit cell detector matrix $$\text{further defined: } [h_1] = \begin{bmatrix} 1 & 1 & 1 & 1 \\ 1 & 1 & -1 & -1 \\ 1 & -1 & -1 & 1 \\ 1 & -1 & 1 & -1 \end{bmatrix}$$

$$[d] = \begin{bmatrix} D_{11} & D_{21} & D_{31} & D_{41} \\ D_{12} & D_{22} & D_{32} & D_{42} \\ D_{13} & D_{23} & D_{33} & D_{43} \\ D_{14} & D_{24} & D_{34} & D_{44} \end{bmatrix}$$

To obtain sequency $S_{03}$ from (1), as an example, the matrix structure reduces to:

$$S_{03} = [1\ 1\ 1\ 1][d]\begin{bmatrix} 1 \\ -1 \\ 1 \\ -1 \end{bmatrix} \quad (2)$$

where: $[1\ 1\ 1\ 1] = [h_2]$ $$\begin{bmatrix} 1 \\ -1 \\ 1 \\ -1 \end{bmatrix} = [h_3]$$

The Haddamard transform matrix is shown in expression (1) as a matrix of ± digits. The $h_1$ matrix is referred to as the Haddamard operator matrix. The unit cells detector matrix, *d*, represents the signal amplitudes from detectors in $D_{11}$ to $D_{44}$. The sequency matrix [S] is the direct transformed output.

In order to illustrate the operation of the invention, the operation required to get the $S_{03}$ output as shown by expression (2) will be described. The clock pulse polarity can be determined for $\phi_1 \ldots \phi_8$ during the $S_{03}$ time period. The outputs from the amplifier $A_1 \ldots A_4$ will be $$\begin{aligned} A_1 &= D_{11} + D_{12} + D_{13} + D_{14} \\ A_2 &= D_{21} + D_{22} + D_{23} + D_{24} \\ A_3 &= D_{31} + D_{32} + D_{33} + D_{34} \\ A_4 &= D_{41} + D_{42} + D_{43} + D_{44} \end{aligned} \quad (3)$$

Such amplifier outputs represented by expression (3) are equivalent to multiplying matrix $[h_2]$ by matrix $[d]$, in accordance with expression (2) resulting in a matrix:

$$[A] = [A_1 A_2 A_3 A_4], \quad (4)$$

and as a consequence of multiplying (4) by $[h_3]$, sequency $S_{03}$ results. Note that matrix inputs as at (4) are fed into cells $D_1 \ldots D_4$ respectively. Also, when multiplying matrix of (4) by matrix $[h_3]$ the output of such multiplication will appear at bus 90 with the clocks as they are shown during the $S_{03}$ period being the algebraic sum of:

$$S_{03} = A_1 - A_2 + A_3 - A_4 \quad (5)$$

Therefore it can be seen that the sequency output $S_{03}$ is a summation of all detector signals with ±1 weighting coefficients as determined by $\phi_1 \ldots \phi_8$.

With reference to either the $D_{11} \ldots D_{44}$ matrix in FIG. 1 or its equivalent algebraic representation in expressions (1) or (2), and the details of $D_{11}$ in terms of detector 40 and CCD 30 therein, it should be noted that since the structures of all CCD's 30 are the same, the input to these CCD's being an electrical signal from detectors 40, that the D coefficient of the matrix of FIG. 1 and the expressions in (1) or (2) would be a function of the amplitudes of the signals imposed upon the sensing faces of photon detectors 40. However, the outputs of CCD's 30 will be controlled by logic levels ±1 in accordance with the phase diagram, FIG. 4. Therefore by taking the different vertical slices of the 16 sequencies $S_{00} \ldots S_{33}$, and adding the values of the ± levels for each of the $\phi$'s multiplied by the numeric value of each D coefficient, in each case will give the several sequency outputs.

The clock input $\phi_1$ to CCD 30 weights the signal to $D_{11}$ with a ±1, such that if the clock output is at a high signal, the output to bus 70 will be $+D_{11}$, or if clock $\phi_1$ is at a low signal level, the output to bus 70 will be $-D_{11}$.

A one row or one column of matrix $D_{11} \ldots D_{44}$ could be used for Haddamard transformations in the focal plane wherein each of the unit cells thereof had a $\phi$ input which was different in phase and repetition rate, the outputs of such cells being connected by a common bus bar, such as 70 or 90 whereat the output sequencies would be available. In a four unit cell arrangement four sequencies would be available.

It is out that whether a single row or column matrix or a multiple rectangular matrix were used, that the Haddamard transform in terms of the sequencies at the output bus bars would represent the direct Haddamard transform inapposite to the inverse transform thereof.

Each of the matrices, particularly the matrix in which the unit cells contain photon detectors 40, may be fabricated on a integrated circuit. Therefore, in an integrated circuit construction, detectors 40 would automatically be in the focal plane to effect the desired results.

CCD 30 is shown and discussed in U.S. Pat. No. 3,930,255, FIG. 2 thereof, and may be used throughout the instant system.

A photo diode, such as photon detector 40, is discussed at page 401 of the textbook Solid State Physical Electronics, 2nd Ed., by Von der Ziel, published by Prentice-Hall, Inc., of Englewood Cliffs, N.J., is one type of detector out of many that may be used in the instant system.

Just a final word about one application, of the many, in which this inventive system may be utilized. The sequency outputs at the sequency output terminal of the instant invention may be hard wired to an A/D converter, with the output of the A/D converter being fed to a digital computer type memory. The output of the memory is fed to a pulse-code modulation transmitter which transmits via air the Haddamard sequencies that constitute the coded format of the pulse code to be received by a receiver responsive to pulse coded signals. The receiver output is fed to a D/A converter which feeds an inverse Haddamard transform circuit, known in the art, which in turn feeds a TV-type raster scanned system display also known in the art. No computer program is required to effect this usage. The display shows the actual image, from which the original data in the image focal plane was taken, such as an image of a person, animal, thing or the like.

What is claimed is:

1. A device for providing a Haddamard transform, comprising the combination:

a first matrix of interconnected electronic cells; and a second matrix of interconnected electronic cells, different in structure from the electronic cells of the first matrix, the electronic cells of the first and second matrices including charge coupled devices, said first matrix including a plural number of rows of said electronic cells, each row of said cells being serially coupled to each other, the output of each one of said rows being coupled to an input of one of the cells of said second matrix, one cell of the second matrix per one row of the first matrix.

2. The invention as stated in claim 1, including a rectangular wave generator electronically connected to the first and second matrices.

3. The invention as stated in claim 1, including an amplifier interposed between the output of one of said rows and the input of said one of the cells of the second matrix.

4. The invention as stated in claim 2, wherein the generator provides rectangular waves with predetermined polarities and repetition rates.

5. The invention as stated in claim 1, wherein the solution of the Haddamard transform is obtained at a common output of said second matrix.

6. The invention as stated in claim 1, including photon detectors electrically connected to the charge coupled devices, a detector per charge coupled device.

7. A device for performing a one dimensional Haddamard transform, comprising the combination:

a matrix of electrically interconnected unit cells, each of the unit cells having a charge coupled device fed by a photon detector, the photon detector being positioned in the focal plane from which information is gathered; and a group of multiplexers fed by the matrix and providing output sequencies therefrom representing said direct one dimensional Haddamard transform.

8. The invention as stated in claim 7, including an electrical bias source electrically connected to the detectors.

9. The invention was stated in claim 8, including a rectangular wave generator electrically connected to said matrix.

10. The invention as stated n claim 9, wherein the generator provides rectangular waves with predetermined polarities and repetition rates.

11. The invention as stated in claim 7, wherein the solution of the direct Haddamard transform is obtained at a common output of said matrix.

12. A method for Haddamard transform solutions, comprising in combination the steps of:

(a) feeding a first group of rectangular clock signals of predetermined polarities to a first matrix of interconnected rows of electronic charge coupled cells;

(b) amplifying the outputs of each row comprising the first matrix and feeding the amplified outputs to inputs of cells of a second matrix of interconnected electronic charge coupled cells; and (c) feeding a second group of rectangular clock signals of predetermined polarities to the second matrix.

13. The method as stated in claim 12, including the steps of:

(d) recording the Haddamard sequencies at a common terminal for the coupled cells of the second matrix, subsequent to step (c), thereby providing an output of Haddamard sequencies at a common output terminal.

* * * * *